United States Patent [19]

Kuhn et al.

[11] 4,072,474

[45] * Feb. 7, 1978

[54] MOTOR FUEL COMPOSITION

[75] Inventors: Robert R. Kuhn, Lansdale; Warren H. Machleder, Bluebell, both of Pa.

[73] Assignee: Rohm and Haas Company, Philadelphia, Pa.

[*] Notice: The portion of the term of this patent subsequent to Nov. 5, 1991, has been disclaimed.

[21] Appl. No.: 591,913

[22] Filed: June 30, 1975

Related U.S. Application Data

[63] Continuation-in-part of Ser. No. 505,718, Sept. 13, 1974, abandoned, which is a continuation-in-part of Ser. No. 356,655, May 2, 1973, Pat. No. 3,846,089.

[51] Int. Cl.$^2$ .............................................. C10L 1/22
[52] U.S. Cl. ........................................ 44/58; 44/66; 44/70
[58] Field of Search ................ 44/66, 71, 58, 70, 69; 260/407

[56] References Cited

U.S. PATENT DOCUMENTS

| | | | |
|---|---|---|---|
| 1,692,784 | 11/1928 | Orelup et al. | 44/66 |
| 3,247,115 | 4/1966 | Kluge et al. | 260/485 G |
| 3,381,022 | 4/1968 | Le Suer | 260/485 J |
| 3,383,405 | 5/1968 | Sniegoski | 252/56 S |
| 3,574,574 | 4/1971 | Moore et al. | 44/66 |

*Primary Examiner*—Daniel E. Wyman
*Assistant Examiner*—Mrs. Y. Harris-Smith

[57] ABSTRACT

Motor fuel compositions having detergent properties are disclosed and claimed which are particularly useful in spark-ignition, internal combustion engines. The fuel compositions of the present invention contain certain additives which either substantially eliminate, mitigate against, or maintain at a low level, deposits which would otherwise form in the carburetor, in the intake valves and ports, and in the combustion chamber, including the spark plugs. Such carburetor and intake system (induction system) deposits are to be avoided since they tend to restrict the flow of air through the carburetor especially at idle and at low speeds and/or cause improper valve closing and sluggish valve action. These conditions produce rough engine idling, stalling, and can also result in excessive hydrocarbon and carbon monoxide exhaust emissions. Combustion chamber deposits are to be avoided since they cause an increase in octane requirement, emissions and cause preignition. The fuel additives of the present invention include for induction system deposit control an ester selected from a dimer or trimer acid ester or from other polycarboxylic acid esters, especially dicarboxylic acid esters.

10 Claims, No Drawings

MOTOR FUEL COMPOSITION

This application is a continuation-in-part application of our earlier filed copending U.S. Pat. application Ser. No. 505,718, filed Sept. 13, 1974, now abandoned which in turn is a continuation-in-part application of U.S. application Ser. No. 356,655, filed May 2, 1973, now U.S. Pat. No. 3,846,089.

This invention relates to motor fuel compositions for spark ignition, internal combustion engines. More particularly, this invention relates to a detergent motor fuel containing additives which reduce or prevent the formation of deposits in the carburetor as well as in the induction system and combustion chamber including the spark plugs of an internal combustion engine. Thus, the formulations of the present invention are particularly effective as carburetor detergents to clean up and maintain the cleanliness of the carburetor, the combustion chamber and the spark plugs, and to prevent, reduce or minimize against deposits forming in the induction system such as the area around the valves and ports. The gasoline additive or additives or gasoline fuel additive or additives of the present invention act to control spark plug fouling and thus help to keep the spark plugs relatively clean and relatively free of any deposits. This invention also relates to an additive concentrate of one or more of the additives in mixture, solution or combination.

Modern internal combustion engine design is undergoing and has undergone important changes to meet stricter standards for engine and exhaust gas emissions. A major change in engine design is the feeding or recycling of blowby gases from the crankcase of the engine into the intake air supply of the carburetor rather than the venting of these gases to the atmosphere, as in the past. The blowby gases contain substantial amounts of deposit-forming substances and are known to form deposits in and around the throttle body area of the carburetor. These deposits restrict the flow of air through the carburetor at idle and at low speeds so that an overrich fuel mixture results. This condition produces rough engine idling, stalling and also results in excessive hydrocarbon and carbon monoxide exhaust emissions being emitted to the atmosphere.

In addition to the changes that have already been made, it is anticipated that additional burdens and demands will be placed on present day internal combustion engines and their fuels with the advent of new emission control devices, such as exhaust gas recirculation systems and catalytic exhaust mufflers. Also, the use of certain fuel additives such as the alkyl ammonium phosphate detergents may have to be restricted or eliminated because catalytic exhaust mufflers which utilize metal catalysts will be poisoned by phosphorus-containing compounds.

It is an object of the present invention to provide a detergent motor fuel which will have certain carburetor detergent properties and which will clean up and maintain the cleanliness of the carburetor and also the remainder of the fuel induction system such as the valves and ports and reduce the octane requirement increase of an internal combustion engine. In the present invention the motor fuel used may be an unleaded fuel, a leaded fuel, a low leaded fuel, or a fuel containing manganese. It is another object of the present invention to provide a detergent fuel which will maintain a low level of hydrocarbon and carbon monoxide exhaust gas emissions and which will avoid the use of phosphorus containing additives. It is still a further object of the present invention to provide a detergent fuel which has other desirable properties such as rust and corrosion protection, water demulsibility properties, anti-icing properties, etc. It is a further object of the present invention to provide a multi-functional gasoline additives or additive combinations effective in inhibiting the formation of intake valve deposits in addition to being effective as carburetor detergents, and which can be used at relatively low concentrations (and thus at relatively low cost) for example at the treating level of about 1000 parts per million (p.p.m. on a weight basis in the gasoline), or less, and more preferably 600 p.p.m. or less, and even more preferably 400 p.p.m. or less.

There are, of course, other detergent motor fuel compositions available today, but they generally suffer from one or more deficiencies. Either they are used at very high concentrations, for example, something of the order of 4000 p.p.m.; or if used at the use levels in which we are interested, the available formulations suffer from one or more defects.

We have discovered that the combination of (1) selected tertiary alkyl primary amines having branched backbones and a total of about 6 to 24 carbon atoms; (2) a surface active alkyl ammonium carboxylate salt-ethoxylate alkyl phenol ester of a trimer or dimer acid; and (3) a dimer or trimer acid ester comprising the essentially completely esterified polyester of a dimer or trimer acid, or mixture of dimer and trimer acids, produced by the polymerization or condensation of an unsaturated aliphatic monocarboxylic acid having between 16 and 18 carbon atoms per molecule which is esterified with (or incorporates) a mixture of aliphatic and ethoxylated aromatic alcohols, are effective in reducing or preventing the formation of carburetor and other induction system deposits.

According to one aspect of the present invention, therefore, we provide a normally liquid, multi-functional, additive composition for addition to a leaded, low lead, or unleaded gasoline, or gasoline containing manganese, i.e., to a distillate hydrocarbon fuel comprising a major proportion of a hydrocarbon base fuel distilling within the gasoline distillation range. The three component composition ranging from a total of about 125 to about 1000 parts, on a weight basis, is comprised of about 20 to about 250 parts, and more preferably, about 50 to 100 parts by weight of (1) a tertiary alkyl branched chain primary amine, as above described; about 5 to about 100 parts and, more preferably, about 10 to 25 parts by weight of (2) a surface active alkyl ammonium carboxylate salt-ethoxylated alkyl phenol ester of a trimer or dimer acid, as above described; and about 100 to about 650 parts by weight and, more preferably, about 200 to 400 parts by weight of (3) a trimer acid or dimer acid mixed ester as above described. In an alternative embodiment of the invention and where induction system control, per se, is primarily desired, then components (1) and (2) can be omitted, and component (3) can be utilized itself in the fuel, on a total weight basis of about 100 to about 650 p.p.m., more preferably about 200 to 400 p.p.m., or component (3) can be used in conjunction with component (1) to provide a two-component package or blend providing good carburetor detergency and good induction system deposit control, or component (3) can be used with other carburetor detergents and/or other rust inhibitors. When using a combination or mixture of components (1) and (3), they are used in the same amount as noted above, i.e., about 20 to 250 p.p.m. of (1) and more preferably, about 50 to 100 p.p.m. of (1) and about 100 to 650 p.p.m., more preferably, about 200 to 400 p.p.m. of (3).

On a fuel treating level basis, i.e., on a level related to the gasoline, the three component additive composition should be added to or used in the gasoline at a total level of about 125 to about 1000 p.p.m. (weight basis) and on an individual or component basis, in an amount of from about 20 to 250 p.p.m., and more preferably 50 to 100 p.p.m. of (1); about 5 to about 100 p.p.m., more preferably about about 10 to about 25 of (2); and about 100 to about 650 p.p.m., more preferably 200 to 400 p.p.m. of (3). On a pounds per barrel of gasoline basis, that is about 5 to 62.5, more preferably 12.5 to 25 lbs./1000 barrels (bbls). of gasoline of (1); 1.25 to 25, more preferably 2.5 to 6.25 lbs./1000 bbls. of gasoline of (2); and 25 to 162.5, more preferably 50 to 100 lbs./1000 bbls. of gasoline of (3).

For the concentration of the additive component (3), above (when used alone) and p.p.m. concentration and the pounds per barrel of gasoline treating level is the same as noted for component (3) above i.e., about 25 to 162.5, more preferably about 50 to 100 lbs./1000 bbls. (barrels) of gasoline, or about 100 to 650 p.p.m. more preferably about 200 to about 400 p.p.m. of (3).

For the concentration of the additive mixture (1) and (3) in gasoline, the treating level should be in the range of about 20 to 250 p.p.m., more preferably about 50 to 100 p.p.m., of component (1), and about 100 to 650 p.p.m., more preferably about 200 to 400 p.p.m. of component (3). On a pounds per barrel of gasoline basis, this amounts to about 5 to about 62.5 lbs., more preferably about 12.5 to 25 lbs. per 1000 bbls. of gasoline of component (1); and about 25 to 162.5 lbs. more preferably 50 to 100 lbs. per 1000 bbls. of gasoline of component (3).

The tertiary (tert.) or t-alkyl primary amine, having at least one branched chain, may be represented by the general formula (I).

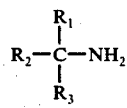

in which $R_1$, $R_2$ and $R_3$ are alkyl groups whose total carbon atom content ranges from 6 to 24. It is preferred that two of the R groups, for example, and $R_1$ and $R_3$ of the t-alkyl primary amine be methyl groups.

The t-alkyl primary amines with branched chains and which may be used in the compositions of the present invention include, for example, t-octylamine, t-nonylamine, t-dodecylamine, t-tetradecylamine, t-octadecylamine, t-docosylamine, t-tetracosylamine and mixtures of two or more such amines. These amines are commonly prepared by reactions known to those skilled in the art such as the reaction of nitriles with alkenes or secondary or tertiary alcohols in strongly acidic media. Commercially available t-alkyl primary amines are often mixtures. t-Octylamine having a branched structure has the formula:

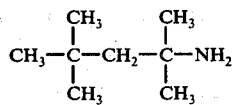

and the alkyl group of this amine will hereinafter be referred to as t-octyl. One form of t-nonylamine is prepared as a mixture containing $$C_6H_{13}C(CH_3)_2NH_2$$

and $$C_7H_{15}C(CH_3)_2NH_2$$

and has a neutral equivalent of about 142. A commercial preparation which can be used in the present invention is readily available under the trademark Primene 81-R which is the trademark used for a mixture of t-dodecyl, t-tridecyl- and t-tetradecylamines or principally a mixture of $t\text{-}C_{12}H_{25}NH_2$ to $t\text{-}C_{14}H_{29}NH_2$ amines having a neutral equivalent of about 191. Another commercial preparation which is useful in the present invention is available under the trademark Primene JM-T. Primene JM-T. Primene JM-T is principally a mixture of $t\text{-}C_{18}H_{37}NH_2$ to $t\text{-}C_{22}H_{45}NH_2$ amines and has a neutral equivalent of about 315. The important consideration is that in a t-alkyl primary amine, the $NH_2$ group is always attached to a carbon atom containing no hydrogen atoms and in the present invention at least one of the alkyl groups is branched.

The alkyl ammonium carboxylate salt-ethoxylated alkyl phenol ester of a trimer or dimer acid (or mixture thereof) is added or included primarily to provide rust and/or corrosion protection although there is also some modest carburetor detergency activity, has the following formula (II):

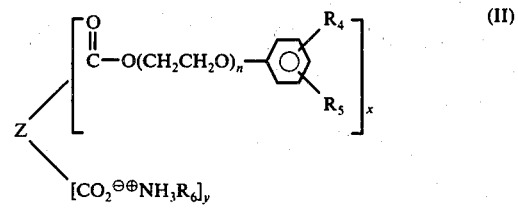

where
- $n$ is an average number from about 1 to 12.5 and more preferably from about 3 to 10; and in the case of a salt-ester derived from a trimer acid $x$ is 1 or 2, and $y$ is 1 or 2, the sum of $x$ and $y$ being 3, and in the case of the salt-ester derived from a dimer acid, both $x$ and $y$ are each 1;
- $R_4$ is an alkyl group containing 4 to 12 carbon atoms; $R_5$ is H or an alkyl group containing 4 to 12 carbon atoms; $R_6$ is an alkyl group containing 2 to 24 carbon atoms which may be straight or branched chain or an amine substituted alkyl group of 2 to 24 carbon atoms. Preferably, $R_6$ contains 12 to 22 carbon atoms; and Z is a saturated or unsaturated hydrocarbon residue of the acid, said hydrocarbon residue having 34 to 51 carbon atoms. (Z will ordinarily have 51 carbon atoms in the case of a trimer acid, and ordinarily 34 carbon atoms in the case of a dimer acid).

The alkyl ammonium carboxylate salt-ester, i.e., component (2) may be used as all trimer acid derivative or all dimer acid derivative, or any mixture of the dimer and trimer acid derivatives may be used in the present invention.

Also, the presence of some monocarboxylic $C_{18}$ acids or the like in the ester or salt form, or mixtures of both ester and salt form, may be tolerated in minor amounts, about 5% or less.

Specific embodiments of the alkyl ammonium carboxylate salt-ester of the general formula II, above, and wherein $R_4$ is substantially or essentially all octyl, i.e. — $C_8H_{17}$, and $R_5$ is H and which are usable in the present invention are given in Table I below:

TABLE I

| Alkyl ammonium carboxylate salt-ester | n | $R_6$ | X | Y |
|---|---|---|---|---|
| A | 1.5 | t-$C_{12-14}$ | 1 | 2 |
| B | 1.5 | t-$C_{12-14}$ | 2 | 1 |
| C | 3 | t-$C_{12}$- | 1 | 2 |
| D | 3 | t-$C_{12-14}$ | 2 | 1 |
| E | 5 | t-$C_{12-14}$ | 1 | 2 |
| F | 7.5 | t-$C_{12-14}$ | 1 | 2 |
| G | 9.5 | t-$C_{12-14}$ | 1 | 2 |
| H | 9.5 | t-$C_{12-14}$ | 2 | 1 |
| I | 12.5 | t-$C_{12-14}$ | 1 | 2 |
| J | 3 | $CH_2CH_2NH_2$ | 2 | 1 |
| K | 3 | $(CH_2CH_2NH)_2H$ | 2 | 1 |
| L | 3 | $(CH_2CH_2NH)_3H$ | 2 | 1 |
| M | 1.5 | t-$C_{12-14}$ | 1 | 1 |
| N | 3 | t-$CH_{12-14}$ | 1 | 1 |
| O | 9.5 | t-$CH_{12-14}$ | | 1 |
| P | 3 | t-$C_{18-22}$ | 1 | 1 |
| Q | 3 | t-$C_{18-22}$ | 2 | 1 |
| R | 3 | t-$C_{18-22}$ | 1 | 2 |
| S | 5 | t-$C_{12-14}$ | 1 | 1 |
| T | 1.5 | t-$C_{18-22}$ | 1 | 1 |
| U | 5 | t-$C_{18-22}$ | 1 | 1 |
| V | 5 | t-$C_{12-14}$ | 2 | 1 |
| W | 7.5 | t-$C_{12-14}$ | 2 | 1 |
| X | 10 | t-$C_{12-14}$ | 2 | 1 |
| Y | 1.5 | t-$C_{18-22}$ | 2 | 1 |
| Z | 5 | t-$C_{18-22}$ | 2 | 1 |
| A' | 1 | t-$C_{12-14}$ | 1 | 2 |
| B' | 10 | t-$C_{12-14}$ | 1 | 2 |
| C' | 1 | t-$C_{18-22}$ | 1 | 2 |
| D' | 5 | t-$C_{18-22}$ | 1 | 2 |

The alkyl ammonium carboxylate salt ester can be made in known fashion, by the acid catalyzed esterification of a suitable dimer or trimer acid, or mixture thereof, for example, in the case of the diester-monosalt, with two moles of a suitable ethoxylated alkyl phenol followed by conversion of the remaining carboxylic acid functionality to an alkyl ammonium carboxylate salt with the addition of a suitable amine. The trimer acid may be the product derived from the trimerization reaction of a $C_{18}$ unsaturated fatty acid; an example of a suitable trimer acid is that available under the trademark Empol 1041. The preparation of such dimer and trimer acids is described in U.S. Pat. No. 2,632,695. A generalized reaction scheme for the preparation of an alkyl ammonium carboxylate saltester is shown below using a trimer acid for illustrative purposes:

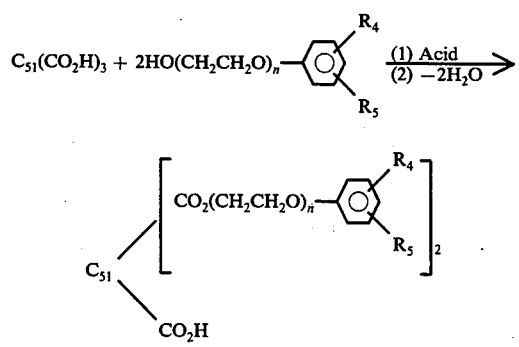

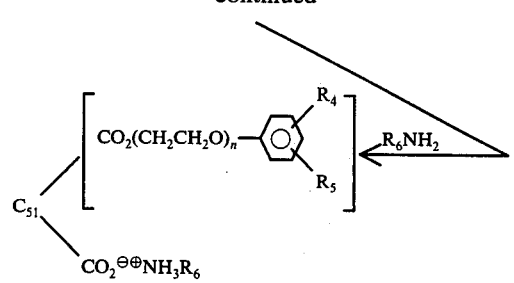

where $n$, $R_4$, $R_5$ and $R_6$ have the values given previously, and $C_{51}$ is the carbon atom content of the hydrocarbon residue.

In order to provide induction system and combustion chamber deposit control, including control against spark plug fouling, there is included in the additive or additive combination, a mixed polyester of a dimer acid or a trimer acid, or mixture of such dimer and trimer acids. The mixed polyesters as well as the dimer and trimer acids may be prepared in known fashions. For example, an unsaturated aliphatic monocarboxylic acid having between about 16 and 18 carbon atoms per molecule, for example linoleic acid can be polymerized or condensed to form essentially the dimer of linoleic acid, a dicarboxylic acid, and also the aliphatic monocarboxylic acid can be polymerized to form essentially the trimer of linoleic acid, a tricarboxylic acid. Mixtures of such dicarboxylic and tricarboxylic acids may also be formed. Similarly, other $C_{16}$ and $C_{18}$ unsaturated aliphatic monocarboxylic acids, including ricinoleic and linolenic acid can be polymerized to dimer and trimer acids or mixtures of such dimer and trimer acids. The preparation of such dimer and trimer acids is described in U.S. Pat. No. 2,632,695. The mixed polyesters used in the present invention are prepared by reacting a suitable amount of a mixture of an aliphatic alcohol and an ethoxylated aromatic alcohol with the polycarboxylic acid to esterify essentially all of the carboxyl groups in the acid. Esterification is conducted according to conventional, known methods. The aliphatic alcohols which are suitable for this purpose are preferably saturated aliphatic alcohols, having from about 1 to 24 carbon atoms. Representative aliphatic alcohols include methyl alcohol, propyl alcohol, n-butyl alcohol, isobutyl alcohol, hexyl alcohol, 2-ethylhexyl alcohol, decyl alcohol, dodecyl alcohol, tridecyl alcohol, isodecyl alcohol, lauryl alcohol, stearyl alcohol hexadecyl alcohol, and nondecyl alcohol. Preferably, the aromatic or aromatic containing alcohols which are used are alkylated phenols which have been ethoxylated with varying amounts of an alkylene oxide such as ethylene oxide. (These materials are known generally as alkylphenoxypolyethoxy ethanols.) The number of moles of ethylene oxide which may be condensed with the alkylated phenol may vary from about one to about 20 ethylene oxide units, and more preferably from about one to four moles of ethylene oxide. While the presence of some unreacted alcohols and some completely esterified all-aliphatic or all-ethoxylated aromatic esters will be present in the esterification mixture, the principal active ingredient or the principal active mixture polyester has the following general formula:

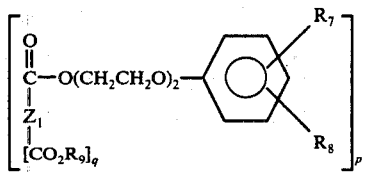

wherein n is an average number of from about 1 to 20 and, more preferably, of from about 1 to about 4; and in the case of the mixed polyester derived from a trimer acid, $p$ is 1 or 2 and $q$ is 1 or 2, the sum of $p$ and $q$ being 3; and in the case of the mixed ester derived from a dimer acid, both $p$ and $q$ are each 1; and where $Z_1$ is a saturated or unsaturated hydrocarbon residue having an average of 34 to 51 carbon atoms, said residue being the residue of a dimer or trimer acid of linoleic acid, or mixture of said dimers and trimers of linoleic acid; $R_7$ is an alkyl group containing 4 to 12 carbon atoms, more preferably 8 to 9 carbon atoms; $R_8$ is H or an alkyl group containing 4 to 12 carbon atoms, more preferably H; $R_9$ is an alkyl group containing 1 to 24 carbon atoms which may be straight or branched chain.

The aromatic alkoxylated alkyl phenols are preferably based on either octyl or nonyl phenol and can contain approximately 1 to 20 moles of ethylene oxide, and more preferably about 1 to about 4 moles of condensed ethylene oxide. Also, the mixed polyester when based on a mixture of dimer and trimer acids, as hereinabove described, are preferably based on a mixture containing at least about 60% trimer acid, and more preferably, at least about 80% trimer acid.

In the following examples, and throughout the specification, disclosure, and claims, all parts and percentages are by weight, unless otherwise stated. The ability of the additive or additive combinations of this invention to clean up and maintain the cleanliness of the carburetor of an internal combustion engine is illustrated, and its ability to remove or protect against the formation of induction system deposits is also illustrated below. Also illustrated below is the ability of the additives to reduce octane requirement increase in an internal combustion engine. Unless otherwise stated, an MS-08 gasoline fuel is used for the Blowby carburetor detergency Keep Clean engine test and a Howell Unleaded Gasoline is used for the Induction System Deposit Test. The Howell Unleaded Gasoline has the following properties:

| HOWELL UNLEADED GASOLINE: FUEL SPECIFICATION EL-72-1 | | |
|---|---|---|
| Aromatic content | percent | 30.2 |
| Olefins | " | 11.6 |
| Saturates | " | 58.2 |
| Lead | g./gal. | 0.03 |
| Sulfur | wgt.percent | 0.009 |
| Gravity | API | 57.9 |
| Reed vapor pressure | | 8.1 |
| Research octane | | 91.7 |
| Motor octane | | 83.8 |
| Initial B.P. | °F | 94 |
| 50% distilled | °F | 228 |
| 90% distilled | °F | 351 |
| Distillation end point | °F | 426 |

ENGINE TEST EVALUATION OF MULTIPURPOSE CARBURETOR DETERGENTS

(A) Blowby Carburetor Detergency Keep Clean Engine Test (1) Engine test procedure The Blowby Carburetor Detergency Keep Clean Engine Test (BBCDT-KC) measures the ability of a gasoline additive to keep clean the carburetor throttle body area, and is run in a 1970 Ford 351 CID V-8 engine equipped by means of a special "Y" intake manifold with two one-barrel carburetors, which can be independently adjusted and activated. With this arrangement, a separate test fuel can be evaluated by each carburetor which feeds four of the eight cylinders via the non-interconnected intake manifold. The carburetors are modified with removable aluminum sleeves in order to facilitate weighing of the deposits which accumulate in the throttle body area. The severity of the test is adjusted to an appropriate level by recycling the entire amount of blowby gases, approximately 90–110 c.f.h., to the top of the air cleaner so that each carburetor receives an equal volume of these gases. Equal intake mixture flow through each carburetor is adjusted during the first hour of operation of means of intake manifold differential pressure and CO exhaust gas analysis. The following test cycle and operating conditions are employed:

| Test cycle: | |
|---|---|
| Phase I | 650 engine r.p.m., 8 min. |
| Phase II | 3000 engine r.p.m., 1 min. |
| Test duration, hrs. | 10. |
| Intake air, °F. | 135 ± 10. |
| Jacket water, °F. | 190 ± 10. |
| Engine oil-sump, °F. | 210 ± 10. |
| Percent CO in exhaust | 3.0 ± 0.2. |
| Blowby, c.f.h. | 90–110. |

The weight (mgs.) of deposits accumulated on the aluminum sleeve is measured, and the average value of four tests per additive or additive mixture is reported.

The gasoline used in the BBCDT-KC test is an MS-08 gasoline having the following properties:

| Gravity: | |
|---|---|
| API | 59.7 |
| Sp. gr. at 60° F. | 0.74 |
| ASTM D-86 distillation, °F.: | |
| I.B.P. | 93 |
| 10% | 123 |
| 50% | 205 |
| 90% | 348 |
| E.P. | 405 |
| Percent recovered | 98 |
| Precent residue | 1 |
| Percent loss | 1 |
| Percent sulfur | 0.11 |
| Lead, gm./gal. | 3.08 |
| FIA composition: | |
| Aromatics, percent | 23.1 |
| Olefins, percent | 20.0 |
| Saturates, percent | 56.9 |
| Oxidation stability, minutes | 600+ |
| ASTM gum (unwashed), mg./100 ml. | 1.0 |
| Research octane number | 95.5 |
| Percent H | 13.10 |
| Percent C | 86.61 |
| H/C | 1.80 |

(B) Induction System Deposit Engine Test

(1) Engine test procedure

The Induction System Deposit Test (ISDT) which is used to evaluate the ability of gasoline additives or mixtures of additives to control induction system deposits, is run using a new air-cooled, single cylinder, 4 cycle, 2.5 H.P. Briggs and Stratton engine for each test. The engine is run for 150 hours at 3000 r.p.m. and 4.2 ft. lbs. load, with a 1 hour shutdown every 10 hours to check the oil level. Carbon monoxide exhaust emission measurements are made each hour to insure that a constant air to fuel (A/F) ratio is being maintained.

Upon completion of a test run, the engine is partially disassembled, and the intake valve and port are rated and valve and port deposits are collected and weighed.

(C) Rusting Test Method

A rusting test method for fuel additive rust inhibition is used which follows military specification MIL-I-25017C (Section 4.6.3). This procedure which utilizes a type B medium hard water is a modification of the basic ASTM method D665. The object of the test is to evaluate the ability of a gasoline additive to inhibit rusting of ferrous parts such as encountered in gasoline storage and transportation systems. The method involves stirring a mixture of 300 ml. of an additive blend in depolarized isooctane with 30 ml. of de-ionized-distilled water, medium hard water, or synthetic sea-water, for 5 hours at a temperature of 100° F. (37.8° C.) with a cylindrical steel specimen completely immersed therein. Test results are reported as percent area rusted and a pitting rating is also optionally reported on a scale of 1 to 3, with 3 being the worst degree of pitting and 0 being the best. The type B medium hard water is prepared as follows:

3 stock solutions using ACS reagent-grade chemicals in distilled water containing, respectively, 16.4 g/liter $NaHCO_3$, 13.2 g/liter $CaCl_2.2H_2O$, and 8.2 g./liter $MgSO_4.7H_2O$. Ten ml. of the $NaHCO_3$ stock solution are pipetted into 800 ml. of distilled water in a 1-liter volumetric flask, and then shaken vigorously. While swirling the contents of the flask, 10 ml. of the $CaCl_2$ stock solution are pipetted into the flask and then 10 ml. of the $MgSO_4$ stock solution are also pipetted into the flask, distilled water is then added to bring the volume to 1 liter and mixed thoroughly. The final blend should be clear and free of precipitate.

(D) Combustion Chamber Deposit Engine Test

(1) Engine test procedure

The Combustion Chamber Deposit Engine Test (CCDET) is used to evaluate the ability of a gasoline additive, or mixture of additives to control or reduce the octane number requirement increase (ONRI), in an internal combustion engine, the test is run using a 1972 Chevrolet 350 CID V-8 engine equipped wth a two barrel carburetor and a 1972 Turbo Hydromatic 350 transmission which is connected to a 1014-2 WIG dynamometer equipped with a 200.3 lb. ft.$^2$ inertia wheel. The following test cycle and operating conditions are employed and are intended to simulate an urban taxi cab.

| Test cycle: | |
|---|---|
| Phase I | Start-idle, 650–750 r.p.m. |
| Phase II | Accelerate-1 to 2 shifts, 5.5 sec., 2900–3000 r.p.m. |
| Phase III | Accelerate-2 to 3 shift, 9.5 sec., 2800–2900 r.p.m. |
| Phase IV | 3rd gear, 10.0 sec., 2600 r.p.m. |
| Phase V | Decelerate to idle, 15.0 sec. |
| Test duration | 200 hours |
| Fuel consumption | 1000 gallons (Howell unleaded gasoline plus additive treatment). |
| Intake air ° F. | Ambient. |
| Jacket water, ° F. | 180. |
| Engine oil-sump, ° F. | 220 ± 10. |

Octane number requirement is determined at 24 hours interval under the following engine conditions: transmission in 3rd gear with an output shaft speed controlled at 1500 r.p.m. and the engine throttle wide open. The octane number requirement of the engine is determined at trace knock in terms of primary reference fuels, i.e., the engine is run on a series of blends of isooctane and n-heptane of known octane number until audible knock is perceived. The lowest standardized octane number blend at which the engine does not knock is recorded as the octane number requirement. Octane number requirement increase is then the difference between the initial octane number requirement and the final octane number requirement for a particular test.

The novel fuel compositions may be prepared by adding the individual additives directly to the fuel, or an additive blend or mixture of one or more of the components may be prepared or a concentrate of one or more of the additives in a suitable solvent such as toluene or xylene may be prepared. Also, all of the additive components are normally liquid materials at room temperature and are soluble or miscible with each other and may be distributed without any solvent.

The preparation of a typical mixed polyester employed in the fuel of the invention is as follows:

PREPARATION OF TRIMER ACID, DIISODECYL, MONO-OCTYLPHENOXYPOLY-ETHOXYETHANOL (3 MOLES ETHYLENE OXIDE)TRIESTER

To a 3-l. three-necked round bottom flask fitted with a mechanical stirrer, thermometer, and Dean-Stark trap with reflux condenser are charged 845 g. (1 mole) of a trimer acid mixture (Emery Industries 1834-18R trimer acid), comprising 70–80% trimer acid and 30 to 20% dimer acid, 316 g. (2 moles) of isodecyl alcohol, 338 g. (1 mole) of octylphenoxypolyethoxyethanol containing about 3 moles of condensed ethylene oxide, 200 ml. of toluene, and 1.0 g. of p-toluenesulfonic acid. The reaction mixture is heated to reflux (with stirring which occurs near 135° C. Refluxing is continued for 6 hours during which time the theoretical quantity of water is evolved. Toluene solvent is stripped under vacuum, 3.0 g. of $Na_2CO_3$ added to neutralize the p-toluenesulfonic acid, and the product filtered. The material prepared in this way generally has an acid number near 1.0.

The theoretical product distribution assuming that equilibrium has been obtained and that there are no free energy formation differences between the various esters is the following:

|  | Wt. percent | Mole percent |
|---|---|---|
| Trimer acid, triisodecyl triester | 25.9 | 29.6 |
| Trimer acid, diisodecyl/monooctylphenoxylpoly ethanol (3 moles ethylene oxide) | 44.5 | 44.5 |
| Trimer acid, isodecyl dioctylphenoxypolyethoxyethanol (3 moles ethylene oxide) triester | 25.0 | 22.2 |
| Trimer acid, trioctylphenoxypolyethoxyethanol (3 moles ethylene oxide) | 4.6 | 3.7 |

Actual analysis shows the diisodecylmonooctylphenoxypolyethoxyethanol ester to be present in the preponderant numerical percentage amount, and actual chromatographic analysis conforms substantially with the predicted amount. Changes in the ratio of the ester components may be obtained, by altering the esterification conditions.

The following Table II lists typical mixed polyesters prepared for use with the present invention and in accordance with the above general method:

TABLE II

| Ex: | | |
|---|---|---|
| 1. | Dimethyl/mono-octylphenoxy polyethoxyethanol containing average of 3 moles of condensed ethylene oxide. | Ester of trimer of linoleic acid. |
| 2 | Dibutyl/mono-octylphenoxy polyethoxyethanol with average of 3 moles of ethylene oxide. | " |
| 3 | di-2-ethylhexyl/mono-octylphenoxy polyethoxyethanol with 3 moles of ethylene oxide. | " |
| 4 | Diisodecyl/mono-octylphenoxy polyethoxyethanol with average of 3 moles of ethylene oxide. | " |
| 5 | Di-C$_{16-20}$ aliphatic alcohol/mono-octylphenoxy polyethoxyethanol with 3 moles of ethylene oxide. | " |
| 6 | Mono-isodecyl/di-octylphenoxy poly ethoxyethanol with 3 moles of ethylene oxide. | " |
| 7 | Diisodecyl/mono-octylphenoxy polyethoxyethanol with average of 5 | " |
| 8 | Dimethyl/mono-octylphenoxy ethoxyethanol with average of 1 mole of ethylene oxide. | " |
| 9 | Mono-isodecyl/mono-octylphenoxy polyethoxy ethanol with 3 moles of ethylene oxide. | Ester of dimer of linoleic acid. |

The esterification reaction is usually acid catalyzed and can be carried out over a broad range of temperatures, but usually the temperature will vary from about 75°, to about 180° C. The mixture of aliphatic alcohol and ethoxylated aromatic alcohols can vary fairly widely depending on the products desired, but ordinarily the ratio of the aliphatic alcohol to the ethoxylated aromatic alcohol will vary from about (on a molar basis) one to four to about four to one, and more preferably about one to two to about two to one. The quantity of mixed alcohols used should be sufficient to essentially completely esterify the polycarboxylic acid (i.e. the trimer or dimer acid, or mixture thereof) and there can be used an equivalent amount or slight molar excess of alcohols in relation to the polycarboxylic acid during the esterification reaction.

The base fuel employed in the following examples (Tables III, IV, and V below) is a Howell unleaded gasoline as described hereinabove, except for the BBCDT-KC tests wherein an MS-08 gasoline as described hereinabove is used. Induction System Deposit Test results (ISDT) are reported in milligrams (mg.) of deposit as are the Blowby Carburetor Detergency Keep Clean Engine Test results. Percent rusting is also reported. These test procedures are described above.

TABLE III

| Example | Fuel additive and concentration p.p.m. gasoline | ISDT,[1] mg. deposit Valve & port | BBCDT[2]KC, mg. deposit |
|---|---|---|---|
| Control | Untreated gasoline i.e. base fuel | 365 | 13 |
| Comparative Example A | Triisodecyl ester of trimer of linoleic acid, 300 p.p.m. | 170 | |
| 10. | Mixed dimethyl polyester of Example I (see Table II), 300 p.p.m. | 72 | |
| 11. | Mixed dibutyl polyester of Example 2 (Table II above) 300 p.p.m. | 35 | 18.1 |
| 12. | Mixed diisodecyl polyester of Example 4 (Table II above) 300 p.p.m. | 37 | 14.2 |
| 13. | Mixed diisodecyl polyester of Example 7 (Table II above) 300 p.p.m. | 475 | |
| 14. | Tri-octylpolyethoxy ethanol ester of trimer of linoleic acid with 3 moles ethylene oxide, 500 p.p.m. | 186 | |
| Comparative Example B | Commercially available and used alkyl ammonium phosphate, 500 p.p.m. | 435 | 4.0 |
| Comparative Example C | Commercially available and used polybutene succinimide, 140 p.p.m. | 1,247 | 3.3 |

[1]Induction System Deposit Test as described above.
[2]Blowby Carburetor Detergency Keep Clean Engine Test, as described above.

In Table IV, below, there are shown results obtained with a combination or mixture of additives according to the present invention.

TABLE IV

| Example number | Fuel additive and concentration, p.p.m. in gasoline | ISDT, mg. deposit, valve and port | BBCDT-KC, mg. deposit | Rusting (percent area rusted) | Pitting designation |
|---|---|---|---|---|---|
| 15 | I[1]-50 p.p.m., II[2]-20 p.p.m., IIIa-Mixed diisodecyl ethoxylated polyester of Example 4 (Table II above)-300 p.p.m. | 95 | 2.8, 2.6 | 0 | 0 |
| 16 | I-50 p.p.m., II-10 p.p.m., IIIb-Mixed dibutyl ethoxylated polyester | 264 | 3.4 | 0 | 0 |

TABLE IV-continued

| Example number | Fuel additive and concentration, p.p.m. in gasoline | ISDT, mg. deposit, valve and port | BBCDT-KC, mg. deposit | Rusting (percent area rusted) | Pitting designation |
|---|---|---|---|---|---|
| 17 | I-50 p.p.m., II-20 p.p.m., IIIc-Mixed di-2-ethylhexyl ethoxylated polyester of Example 2 (Table II above)-300 p.p.m. of Example 3 (Table II above)-300 p.p.m. | 487 | | 0 | 0 |
| 18 | I-50 p.p.m., II-20 p.p.m., IIId-Mixed $diC_{16}$-$C_{20}$ aliphatic alcohol ethoxylated polyester of Example 5 (Table II above)-300 p.p.m. | 374 | 4.0 | 4 | 0 |
| 19 | I-50 p.p.m., II-10 p.p.m., IIIe-Mixed mono-isodecyl ethoxylated polyester of Example 6 (Table II above)-300 p.p.m. | 320 | 2.3 | 0 | 0 |
| 20 | I-50 p.p.m., II-15 p.p.m., IIIf-Mixed diisodecyl ethoxylated polyester of Example 7 (Table II above)-300 p.p.m. | 912 | 4.2 | 1 | 0 |
| 21 | I-50 p.p.m., II-5 p.p.m., IIIg-Mixed dimethyl ethoxylated polyester of Example 1 (Table II above)-300 p.p.m. | 414 | | 2 | 0 |
| 22 | I-50 p.p.m., II-20 p.p.m., IIIh-Mixed dimethyl ethoxylated polyester of Example 8 (Table II above-300 p.p.m. | 918 | | 1 | 0 |
| Control | Untreated gasoline, i.e., base fuel | 365 | 13 | 100 | 0 |

[1]Component I (used in the additive package or blend of components I, II, and III above) is a t-$C_{18}$-$C_{22}$ alkyl amine with a highly branched backbone, a neutral equivalent of 315, and a molecular weight principally in the 269–325 range.
[2]Additive component II is essentially an alkyl ammonium carboxylate di-salt ester of the formula

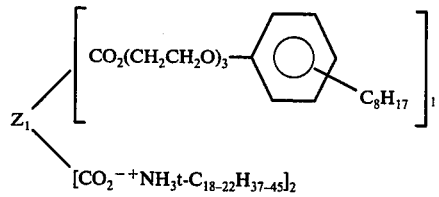

where $Z_1$ is the hydrocarbon residue of the product of trimerization of an unsaturated $C_{18}$ fatty acid, such as linoleic acid, which is a mixture of about 70 – 80% trimer acid ($C_{54}$) and about 30–20% of dimer acid ($C_{36}$), all parts by weight.

TABLE V

| | (Octane number requirement increase)* | |
|---|---|---|
| Example | Fuel additive and concentration, p.p.m., in gasoline | octane number requirement increased |
| Control | Untreated gasoline, i.e. base fuel | 10 |
| Comparative Example D | Commercially available and used polybutene succinide, 140 p.p.m. | 8 |
| 23 | Same additive package or blends as in Example No. 15 (Table IV) (total = 370 p.p.m.) | 4 |
| 24 | Same additive as Example No. 2, Table II at 300 p.p.m. | 5 |

*As measured by the Combustion Chamber Deposit Engine Test

As is evident from the data in Table III, the mixed polyesters of this invention while individually affording no carburetor detergency, activity, per se, are very effective at controlling induction system deposits in an internal combustion engine.

When the mixed polyesters are used in combination with rust inhibitors and carburetor detergents as shown in Table IV so that a multipurpose additive package is formed, the activity of Examples 15, 16 and 19 is significantly better than the base fuel in all three performance categories, i.e., rust inhibitor, carburetor detergency, and induction system detergency. Although Examples 17, 18, 20, 21 and 22 show higher levels of induction system deposits than the base fuel their total performance is significantly better than the base fuel treated with currently used commercial additives such as the alkyl ammonium phosphates and the polybutene succinimides. It is important to remember that untreated gasoline is rarely used in present day automobiles and that gasoline treated with conventional carburetor detergents and rust inhibitors will normally give higher levels of induction system deposits than the base gasoline as is shown in Comparative Examples B and C of Table III.

Although the mechanism of activity is not clear, it is evident from the data in Table V that the additive combination of our invention is effective in modifying the deposits in the combustion chamber such that the octane number requirement increase of the engine is less than with either untreated gasoline or base gasoline treated with a commercially used polybutene succinimide.

In a specific example of an alternative embodiment of this invention, wherein the carburetor detergent (1) and induction system deposit control additive (3) are used (without any added rust inhibitor) in gasoline, at a total concentration of about 350 p.p.m. (50 p.p.m. of 1 and 300 p.p.m. of 3), the following results are obtained; for the ISDT Test, 201 milligrams (mg.) of deposits; and for the BBCDT-KC test, 1.3 mg. of deposits. In this test, component (1) was a t-$C_{18}$-$C_{22}$ alkyl amine such as was used in Example 15, and component (3) was the mixed polyester of Example 4. As noted previously, a Howell unleaded gasoline is used for the ISDT tests, and MS-08 gasoline is used for the BBCDT-KC tests.

In another alternative embodiment of this invention, other dicarboxylic acid esters, such as an adipate diester may be substituted in whole or part for component (3) of the detergent composition, noted above, to provide induction systems deposit control. Thus, an adipate diester comprising the mono-isodecyl, mono-octyl phenoxy polyethoxy ethanol (containing an average of 3 moles of condensed ethylene oxide) mixed ester of adipic acid and made by a conventional acid esterification process, gave the following result: in the ISDT test, 160 mg. of deposit. Other adipic acid esters, e.g., the mixed adipic acid esters comprising a mixed $C_1$-$C_{20}$ alkyl/alkyl phenoxy (alkyl of $C_4$ to $C_9$) polyethoxy ethanol (containing 1 to 20 moles, and more preferably about 1 to 5 moles condensed ethylene oxide) ester may also be used to provide induction system deposit control either alone, or in combination with components (1) and (2) above. The adipic acid ester may be used in the same or greater amount as component (3) noted above, either alone in gasoline or in combination with components (1)* and (2)*, noted above.

*Component (1) refers to the t-alkyl amine (of 6 to 24 carbon atoms) carburetor detergent component and component (2) refers to the surface active alkyl ammonium carboxylate salt-ethoxylated alkyl phenol ester rust inhibitor component, hereinbefore described.

Other results using 300 p.p.m. of the specific mono-isodecyl, mono-octyl phenoxy polyethoxy ethanol (3 moles ethylene oxide) adipic ester noted above in combination with 50 p.p.m. of the t-$C_{18}$–$C_{22}$ alkyl amine (component (1) above) are as follows: in the ISDT test, 225 mg. of deposit, and in the BBCDT-KC test, 2.3 mg. of deposit. When 10 p.p.m. of the rust inhibitor component (2) of Example 15 is added to the mixture of the t-$C_{18}$–$C_{22}$ alkyl amine and the adipic acid ester, noted above, to give a three component system, the following results are obtained: in the ISDT test, 327 mg. of deposit, 2.2 mg. of deposit in the BBCDT-KC test, and 0% area rusted in the rust test described above.

In another example using 50 p.p.m. of the t-$C_{18}$–$C_{22}$ alkyl amine (component (1) above), 5 p.p.m. of the rust inhibitor component (2) of Example No. 15, and 300 p.p.m. of the mono-isodecyl, mono-octyl phenoxy polyethoxyethanol (containing 5 moles of ethylene oxide) adipate ester the following results were obtained: in the ISDT test, 237 mg. of deposit, in the BBCDT-KC test, 3.5 mg. of deposit, and 0% area rusted in the rust test.

In another alternative embodiment of this invention, other carboxylic acid esters may be used and substituted in whole or part for component (3) of the detergent composition, noted above, to provide induction systems deposit control and a lower level of octane number requirement increase; that is to say, these esters may, over a period of time, decrease the level of octane number requirement increase usually experienced by an automobile after it has been driven for several thousand miles. Esters which are preferred are mixed esters of di- or tri- carboxylic acids. By mixed acid esters we mean, in the case of dicarboxylic acids, products comprising a mixed $C_1$–$C_{20}$ alkyl/alkyl phenoxy (alkyl of $C_4$ to $C_9$) polyethoxy ethanol (containing 1 to 20 moles or, more preferably, about 1 to 5 moles of condensed ethylene oxide). The mixed ester may be used to provide induction system deposit control and a lower level of octane number requirement increase (ONRI). By using the ester either alone or in combination with component (1), the carburetor detergent, and/or component (2), the rust inhibitor, noted above, the induction system deposit control may be provided or result and/or a lower ONRI may be provided or result. The mixed acid ester may be used in the same or greater amount as component (3), noted hereinabove, either alone in gasoline or in combination with components (1)* and/or (2)*, noted above.

These esters are prepared in conventional manner by using aliphatic alcohols and alkyl phenoxy polyethoxy ethanols containing 1 to 20 moles of condensed ethylene oxide. Usually, the aliphatic and aromatic alcohols are used in equal amounts.

The terms "mixed acid ester," "mixed polycarboxylic acid ester," or more simply "mixed ester" can also be taken to mean any polycarboxylic acid (the term "poly" means two or more) containing two, three, or more carboxylic groups, wherein at least one of the groups has been substituted with (or contains) a $C_1$ to $C_{20}$ alkyl group and at least one of the carboxylic groups has been substituted with (or contains) an alkyl phenoxy (alkyl of $C_4$ to $C_9$) polyethoxy ethanol (containing 1 to 20 moles or, more preferably, about 1 to 5 moles of condensed ethylene oxide). Preferably, the polycarboxylic acid is completely esterified and substantially no free carboxylic acid groups are present.

The alkyl phenols may contain condensed ethylene oxide units or condensed propylene oxide units.

Some of the acids that may be used in this invention, for example, are listed below:

| | |
|---|---|
| Oxalic Acid | $HO_2CCO_2H$ |
| Malonic Acid | $HO_2CCH_2CO_2H$ |
| Succinic Acid | $HO_2C(CH_2)_2CO_2H$ |
| Glutaric Acid | $HO_2C(CH_2)_3CO_2H$ |
| Adipic Acid | $HO_2C(CH_2)_4CO_2H$ |
| Pimelic Acid | $HO_2C(CH_2)_5CO_2H$ |
| Suberic Acid | $HO_2C(CH_2)_6CO_2H$ |
| Azelaic Acid | $HO_2C(CH_2)_7CO_2H$ |
| Sebacic Acid | $HO_2C(CH_2)_8CO_2H$ |
| Maleic Acid | cis-$HO_2CCH=CHCO_2H$ |

Polybasic acids formed by dimer or trimerization of polyunsaturated fatty acids. Two examples in this category are the $C_{54}$ trimer and $C_{36}$ dimer acids sold commercially by Emery Industries.

| | |
|---|---|
| Phthalic Acid | 1,2-$C_6H_4(CO_2H)_2$ |
| Isophthalic Acid | 1,3-$C_6H_4(CO_2H)_2$ |
| Terephthalic Acid | 1,4-$C_6H_4(CO_2H)_2$ |
| Hemimellitic Acid | 1,2,3-$C_6H_3(CO_2H)_3$ |
| Trimellitic Acid | 1,2,4-$C_6H_3(CO_2H)_3$ |
| Trimesic Acid | 1,3,5-$C_6H_3(CO_2H)_3$ |

Some of the alcohols that can be used to esterify the above noted acids include, for example, those shown in the table below:

| Acid | Alcohol(s) |
|---|---|
| Malonic | Triton X-45*/isodecyl |
| Succinic | Triton X-45/isodecyl |
| Sebacic | Triton X-45/isodecyl |
| Phthalic | Triton X-45/isodecyl |
| Oleic | Triton X-45/isodecyl |

*Triton X-45 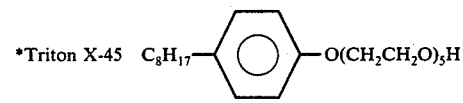

Other polybasic acids which may be used to provide the mixed esters include:
(a) Saturated dibasic acids from oxalic to sebacic ($C_2$–$C_{10}$)
(b) Maleic Acid
(c) Phthalic, isophthalic and terephthalic acids
(d) Fatty acid dimers and trimers.

Example 25

Triton X-45 Isodecyl Succinate

To a 300-ml., three-necked, round-bottom flask equipped with a mechanical stirrer, thermometer to monitor the temperature of the reaction solution and reflux condenser with Dean-Stark trap is charged 24.02 g. (0.24 mole) of succinic anhydride, 102.38 g. (0.24 mole) of Triton X-45*, 39.89 g. (0.252 mole) of isodecyl alcohol, 250 mg. of p-toluenesulfonic acid monohydrate and 20 ml. of toluene. The mixture is heated with stirring under a nitrogen atmosphere to reflux (pot temperature 167° C.) and maintained for 3 hr. during which time approx. 5 ml. of water separates (4.3 ml. theory).

The reaction mixture is concentrated under vacuum up to a temperature of 160° C. at 0.7 mm. After cooling to 50° C., 5 g. of dried Amberlite IRA-93** beads are added and the mixture is stirred for ½ hour at that temperature under vacuum (approx. 20 mm). Vacuum filtration affords 153.7 g. of Triton X-45 Isodecyl Succinate as a golden oil. Yield is 96% of theoretical; acid number is 1.5.

*Triton X-45 32 Octylphenoxypolyethoxyethanol containing about 5 moles of condensed ethylene oxide.
**Amberlite IRA-93 = A weakly basic polystyrene-polyamine anion exchange resin.

Anal. Calc'd. for $C_{38}H_{66}O_9$: C, 68.43; H, 9.97; O, 21.59. Found: C, 68.57; H, 10.30; O, 20.87.

Example 26

Triton X-45 Isodecyl Adipate

A mixture of 584 g. (4 moles) of adipic acid, 758 g. (4.8 moles) of isodecyl alcohol, 1704 g. (4 moles) of Triton X-45, 5.8 g. of p-toluenesulfonic acid monohydrate and 400 ml. of toluene is heated under a nitrogen atmosphere to reflux in an apparatus equipped for water separation. During the course of 7 hr. 149 ml. of water evolve (144 ml. theory) and the pot temperature rises to 175° C. Vacuum concentration to 165° C. (35 mm.) is followed by treatment of the residue at 50° C. with 120 g. of dried Amberlite IRA-93 for ½ hour. Vacuum filtration gives 2640 g. of Triton X-45 Isodecyl Adipate (95% yield). Acid number is 0.4.

Example 27

Triton X-45 Isodecyl Sebacate

To a three-necked, round-bottom flask fitted with a mechanical stirrer, thermometer, and reflux condenser with Dean-Stark trap is charged 32.4 g. (0.16 mole) of sebacic acid, 68.25 g. (0.16 mole) of Triton X-45, 27.86 g. (0.176 mole) of isodecyl alcohol, 250 mg. of p-toluenesulfonic acid monohydrate and 20 ml. of toluene. The mixture is heated at reflux with stirring under nitrogen for 3 hr. during which time the temperature rises to 158° C. and 5.4 ml. of water evolve (5.8 ml. theory).

Concentration to 175° C./4 mm. is followed by treatment at 50° C. for ½ hour with 4 g. of dried Amberlite IRA-93. Vacuum filtration gives 114.8 g. (95.5% yield) of Triton X-45 Isodecyl Sebacate. Acid number is 1.1.

Anal. Calc'd. for $C_{44}H_{78}O_9$: C, 70.36; H, 10.46; O, 19.17 Found: C, 71.12; H, 10.84; O, 19.08.

Example 28

Triton X-45 Isodecyl Isophthalate

Isophthalic acid (36.55 g., 0.22 mole), 93.85 g. (0.22 mole) of Triton X-45, 37.0 g. (0.234 mole) of isodecyl alcohol, 250 mg. of p-toluenesulfonic acid monohydrate and 20 ml. of toluene are charged to a 300 ml., three-necked round-bottom flask equipped with a mechanical stirrer, thermometer and reflux condenser with Dean-Stark trap. The mixture is heated at reflux with stirring under nitrogen for 61 hr. during which time 7.4 ml. of water evolve (7.9 ml. theory) and the temperature of the solution rises to 183° C. The cooled reaction mixture is vacuum filtered and concentrated to 175° C./0.5 mm. Treatment of the residue for ½ hr. at 50° C. with 5 g. of dried Amberlite IRA-93 followed by vacuum filtration affords 143.48 g. (91% yield) of Triton X-45 Isodecyl Isophthalate. Acid number is 7.2.

Anal. Calc'd. for $C_{42}H_{66}O_9$: C, 70.56; H, 9.30; O, 20.14. Found: C, 70.13; H, 9.40; O, 19.32.

Since the esterifications described above (Examples 25-28) involve the azeotropic removal of water to drive the reactions to completion, the temperature of the reaction mixture is determined by the reflux temperature of the particular system under consideration. This of course can be varied by modifying the solvent (toluene) charge. A practical temperature range for rapid product formation would be 102°–180° C.

Examples of suitable catalysts would be p-toluenesulfonic acid, sulfuric acid and Lewis acids (e.g., boron trifluoride). At lower temperatures acidic, cationic ion exchange resins such as Amberlyst 15 could be employed.

In patent application U.S. Serial Number, 505,718, covering composition of matter, we claim the use of mixed $C_1$–$C_{20}$ alkyl/alkyl phenoxy polyethoxy ethanol (containing 1 to 20 moles of ethylene oxide) esters of polybasic acids for octane number requirement increase control (ONRI). Additional results showing the effectiveness of mixed esters of dibasic acids for controlling ONRI are presented in Table VI. It is evident from the data that the listed mixed esters provide ONRI control superior to that of base nonleaded gasoline and base gasoline treated with two currently used commercial gasoline additives.

Table VI

Octane Number Requirement Increase Control: Performance of Dibasic Acid Esters in Non-leaded Fuel (Phillips "J")

| Additive | Concentration ppm | ONRI 10 Hr. Test |
|---|---|---|
| Control | — | 3.9 |
| Commercial Additive X | 80* | 4.8 |
| Commercial Additive Y | 400* | 6.1 |
| Triton X-45/Isodecyl Succinate | 250 | 1.6 |
| Triton X-45/Isodecyl Adipate | 250 | 0.8 |
| Triton X-45/Isodecyl Sebacate | 250 | 0.5 |
| 1,3 Triton X-45/Isodecyl Phthalate | 250 | 0.5 |

*Recommended concentrations

Experimental Data

The ONRI control data shown in Table VI were generated in a single-cylinder laboratory engine test. Test details and operating procedures are as follows:

| Engine Test: Specifications: | Single Cylinder CLR Engine Compression ratio 8.0:1 Four-Cycle Air: Fuel 14.5:1 Temp.: Oil 190° F ± 5 Inlet Air 90° F ± 5, 80 gr. $H_2O$/lb. d.a. Water out 190° F ± 5 Ignition Timing 14° BTC |
|---|---|
| Operation: | Test Cycle: 1800 rpm - 2 hrs. wide open throttle 1000 rpm - 45 min. no load Test Duration - 100 hrs. Spark plug change - every 50 hrs. Oil - SAE 10W-40 Fuel - nonleaded (Phillips "J") - consumption 80 gal./100 hrs. |

The additive or additives of the present invention are also useful in two cycle or four cycle engines. In a two cycle engine the additive or additives are first added to an oil for use in a two cycle engine and the oil containing the additive or additives is then added or blended with the gasoline. The manner of adding or blending the oil to or with the gasoline is immaterial as far as this invention is concerned; however, for example, the oil containing the additive or additives may be blended with the gasoline in a single tank as in many lawn mowers or the oil may be added into the intake port just after the carburetor and blended with the gasoline in the cylinder as in many motorcycles. This requires two tanks - one for the two cycle oil and one for the gasoline. The ester additive, per se, note, for example, Additive "B" in Table VII below which is very effective when added to a two cycle oil for control or prevention of deposits in the combustion chamber, e.g., Exhaust Port Plugging and spark plug fouling are prevented or controlled. Similarly, as shown in Table VII, the multicomponent Additive "A" is also effective in preventing or controlling Exhaust Port Plugging and spark plug fouling and combustion chamber deposits. Moreover, multicomponent additive "A" is effective in preventing or controlling deposits when used with a manganese containing gasoline either in a two cycle engine or a four cycle engine. When the multicomponent additive "A", or its analogues or variants is added to a gasoline containing manganese for use in a four cycle engine, the overall amounts of the Additive "A" is essentially the same as used with other gasolines, i.e., leaded, low-lead, or non-lead containing gasolines. The internal ratios of the three active components are given on pages 4 through 7 of the specification. Additive "A" and Additive "B" as shown in Table VII are merely illustrative of the present invention, as other related additives may also be used in the present invention. In Table VII, multicomponent additive "A" comprises about 12½% of a t-alkyl amine containing about 18–22 carbon atoms; about 1¼% of the di-salt mono-ester, i.e., the di-alkyl ammonium carboxylate salt-ethoxylated alkyl phenol ester of a trimer acid having a hydrocarbon residue of about 51 carbon atoms as hereinbefore disclosed and wherein the alkyl ammonium carboxylate salt moiety contains about 18–22 carbon atoms and the mono ester moiety is the octylphenoxypolyethoxyethanol, containing about 3 moles of condensed ethylene oxide; about 62½% of the monooctylphenoxypolyethoxyethanol containing about 5 moles of condensed ethylene oxide/monoisodecyl ester of adipic acid, and wherein the balance is xylene which acts as a carrier or diluent. Additive "B" is the ester, per se, i.e., the monoisodecyl/mono-octylphenoxy-polyethoxy ethanol containing about 5 moles of condensed ethylene oxide, mixed ester of adipic acid.

The above description is noted in more detail in Table VII, presented hereinafter.

Table VII

Exhaust Port Plugging
Lawn-Boy Two Cycle Engine Test

| Additive | Concentration (ppm) | Test Hours | % Exhaust Port Plugging |
|---|---|---|---|
| Control | — | 70, 56 | 95*, 93* |
| (1) Additive "A" | 400 | 70, 56 | 47*, 56* |
| Control | — | 79, 57, 57 | 96*, 98*, 95** |
| (2) Additive "B" | 250 | 79 | 33* |
| | 400 | 57, 57 | 8*, 15** |

*MS08 leaded research fuel
**Non-leaded research fuel

Test Procedure

Two Lawn-Boy (two-cycle) power mowers were run, one on a test fuel and one on a base fuel side-by-side. The test was terminated when the engine running on base fuel would no longer operate. At this point both engines were dismantled and rated for exhaust port plugging. The blockage of the exhaust port was the reason the control engine would no longer operate.

The spark plugs in the additive treated engine were cleaner than those in the control engines.

When the ester, per se, is added to a leaded, low-lead, non-lead or manganese containing gasoline for a four cycle engine and in order to prevent or control combustion chamber deposits including spark plug deposits, it may be added in an amount of about 100 to 1000 p.p.m. or in percentage terms about 0.01% to 0.1%. When the ester, per se, for example Ester Additive "B" (Table VII) is added to an oil for use in a two cycle engine, the ester may be first added to an appropriate oil in a concentration of about 100 p.p.m. to 50,000 p.p.m or 0.01% to 5%; the oil is then added to or blended with the gasoline in a ratio of about 1 part of the additive-containing oil to about 15 to 100 parts of gasoline, all parts being on a weight basis. The multi-component additive (such as additive "A" in Table VII) similarly may be added to the two-cycle oil and then to the gasoline in the same amounts as the ester, for example Ester Additive "B" (Table VII) per se. The relative proportion of the amine carburetor detergent, rust inhibitor, and the ester internally in additive "A" for example, may vary, rationwise, as disclosed hereinbefore with reference to a four-cycle engine, see pages 4 through 7 of the specification for the relative proportions of the three active ingredients. A small amount of xylene, as noted with respect to additive "A", Table VII, may be included as a carrier or diluent. The xylene may be included as a carrier or diluent. with other additives if desired.

We claim:

1. A motor fuel composition consisting essentially of (a) a major amount of a hydrocarbon fuel for internal combustion engines, and (b) a minor detergent amount of a mixed polyester of a polycarboxylic acid residue and a mixed ester group residue of a $C_1$–$C_{24}$ alcohol and a $C_4$–$C_9$ alkyl phenoxy polyethoxy ethanol containing 1–20 moles of ethylene oxide.

2. A composition as in claim 1 wherein the ratio of $C_1$–$C_{24}$ alcohol to $C_4$–$C_9$ alkyl phenoxy polyethoxy ethanol is about 1:4 to about 4:1.

3. A composition as in claim 1 wherein the polycarboxylic acid residue is derived from a tricarboxylic acid and the polyester contains substantially no free carboxylic acid groups.

4. A composition as in claim 1 wherein the carboxylic acid residue is a residue of oxalic acid, malonic acid, succinic acid, glutaric acid, pimelic acid, suberic acid, azelaic acid, sebacic acid, maleic acid, phthalic acid, isophthalic acid, terephthalic acid, hemimelitic acid, trimellitic acid or trimesic acid.

5. A composition as in claim 1 wherein the polyester is the mono-isodecyl/mono-octylphenoxypolyethoxy ethanol ester of succinic acid wherein the polyethoxy portion contains about five moles of condensed ethylene oxide.

6. A composition as in claim 1 wherein the polyester is the mono-isodecyl/mono-octylphenoxypolyethoxy ethanol ester of isophthalic acid wherein the polyethoxy portion contains about five moles of condensed ethylene oxide.

7. A composition as in claim 1 wherein the polyester is the mono-isodecyl/mono-octylphenoxypolyethoxy ethanol ester of sebacic acid wherein the polyethoxy portion contains about five moles of condensed ethylene oxide.

8. A composition as in claim 1 wherein the hydrocarbon fuel is gasoline.

9. A composition as in claim 8 wherein the gasoline is a leaded, low-lead, no-lead or manganese-containing gasoline.

10. A composition as in claim 1 wherein the polyester is present in an amount of about 0.01–0.1% based on the weight of the hydrocarbon fuel.

* * * * *